A. M. GRUBBS.
ANIMAL TRAP.
APPLICATION FILED MAY 11, 1915.

1,167,493.

Patented Jan. 11, 1916.

Inventor
ALBERT M. GRUBBS

UNITED STATES PATENT OFFICE.

ALBERT M. GRUBBS, OF PORTLAND, OREGON.

ANIMAL-TRAP.

1,167,493. Specification of Letters Patent. Patented Jan. 11, 1916.

Application filed May 11, 1915. Serial No. 27,449.

*To all whom it may concern:*

Be it known that I, ALBERT M. GRUBBS, a citizen of the United States, and a resident of Portland, county of Multnomah, and State of Oregon, have invented a certain new and useful Improvement in Animal-Traps, of which the following is a specification.

This invention relates to improvements in animal traps.

One of the main objects of this invention is to provide an animal trap of simple and economical construction which will be perfectly sanitary and which will be strong and durable.

Another of the special features of this invention is the novel manner in which the trap may be set and released.

The spring-jaw traps of like type, as heretofore made, had to be set and handled very carefully when set, because so easily sprung, and it not infrequently happened that the trap was accidentally sprung while being set or placed in position, and in large traps such accident might injure the person. In my trap, however, such accident is not liable to occur, because the trap may be safely set and handled; and yet a very slight depression of the trigger is sufficient to spring the trap.

The details of my invention are herein after fully set forth in a description of the accompanying drawings, in which—

Figure 1:
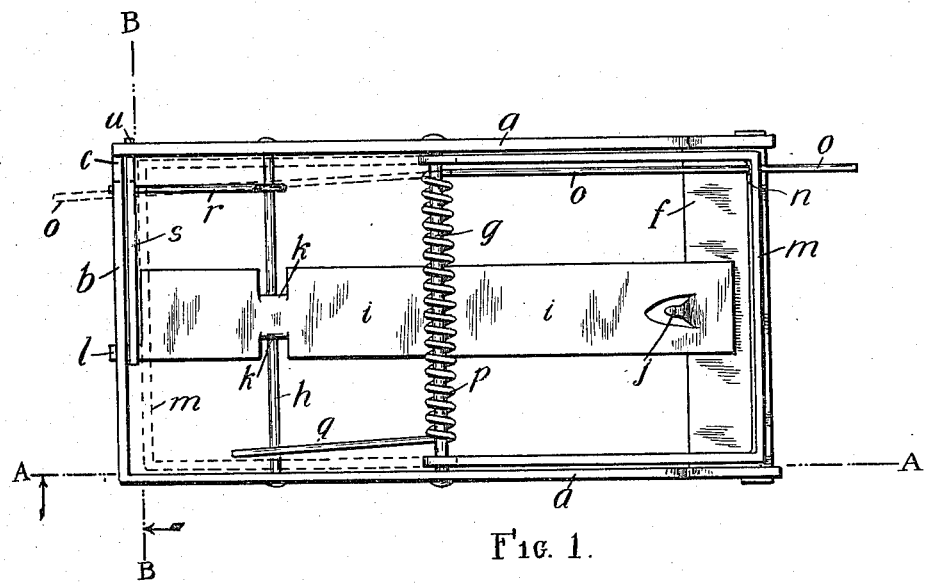
Figure 2:
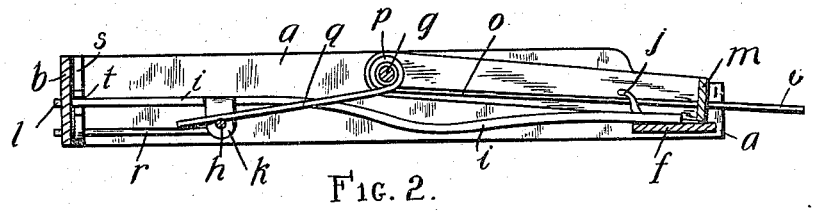
Figures 3, 4:
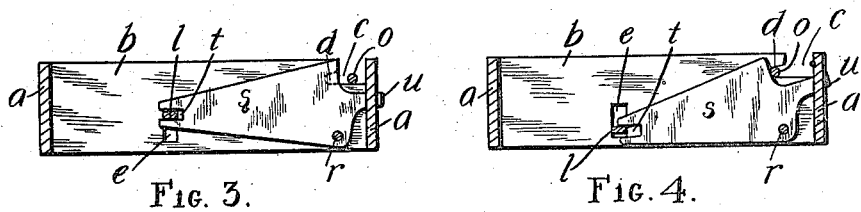

Figure 1 is a plan or top view of my trap, the full lines of this figure showing the same before set, and the broken lines showing it after it has been set. Fig. 2 is a longitudinal section on the line A—A of Fig. 1, showing the trap as normally appearing or after having been sprung; and Figs. 3 and 4 are sections on the line B—B of Fig. 1, illustrating the operation of the means for setting and springing my trap, such means being shown in their normal state in Fig. 3, and in Fig. 4 as appearing after the trap has been set.

The skeleton frame of the trap comprises the side members $a$, $a$, and the rear cross-member $b$. The member $b$ is made with a recessed portion $c$, which is provided with a lateral notch $d$. The rear cross-member $b$ is furthermore provided with a vertical slot $e$. These parts are shown clearly in Fig. 4. The front ends of the frame sides $a$, $a$, are connected by a cross-bar $f$. Hinge-bars $g$ and $h$ are rigidly fixed between the side members $a$, $a$. A longitudinally extending trigger $i$ is provided with laterally extending ears $k$, by means of which the trigger is rotatably mounted on the hinge bar $h$. The forward end of the trigger $i$ is provided with a hook $j$, adapted to hold the bait. The rear end of the trigger is provided with a finger, or lug $l$, which extends through the slot $e$, of the frame member $b$, and limits the rotary movement of the trigger $i$, about the bar $h$. A spring-actuated jaw $m$ is hinged on the bar $g$ and the cross-member of said jaw is provided with a slot $n$. A torsion spring $p$ is mounted on the bar $g$ and one end $o$, of the spring extends through the slot $n$ of the jaw member and the other end $q$ of the spring bears on the bar $h$ as shown in Figs. 1 and 2.

A hinge pintle $r$ is mounted on the bar $h$ and its outer end has a bearing in the rear member $b$ of the trap frame. Hingedly mounted on the pintle $r$ is a plate $s$. Said plate $s$ is made with a slot $t$, at one end, which slot engages the finger $l$ of the trigger $i$. The latch $s$ is furthermore provided on its other end with a lug or finger $u$, which extends through a guide slot in the adjacent side frame $a$, and limits the rotary movement of the latch $s$ about the bar $r$.

The general operation of this device is as follows: When the trap is to be set, the jaw $m$ is thrown over to the position shown in the broken lines of Fig. 1, which motion will bring the projecting end $o$, of the torsion spring $p$ into the recess $c$. The positions of the parts at this phase of the operation are shown in Fig. 3. When the spring end $o$ is pushed to the left, (having reference to Fig. 3) it will enter the notch $d$ and at the same time rotate the plate $s$ to the position shown in Fig. 4. This action will elevate the forward end of the trigger $i$. When the bait on the hook $j$ is disturbed, the trigger $i$ will be rocked so as to cause the finger $l$ to be raised, thereby rocking the plate $s$ clockwise and throwing the spring $e$ $o$ outward from the notch $d$, whereupon the action of the spring $p$ will throw the jaw $m$ violently forward to the normal position, as shown in the full lines of Fig. 1.

I claim:

1. In an animal trap, the combination of a spring actuated jaw, an arm projecting from the latter, means for engaging said arm when the jaw is set, such means operable to disengage said arm by the lateral movement of the latter, a rockable member operable to bear against the extremity of said arm and laterally move the same, and a bait holding trigger hinged on an axis parallel to that of the jaw, the inner end of said trigger being connected with said rockable member, and rocking the latter when the front end of the trigger is depressed.

2. An animal trap comprising a skeleton frame, a spring-actuated jaw hinged in such frame and arranged to strike the front cross-bar of the latter, an arm projecting from the front end of said jaw, means on the rear end of said frame for engaging the extremity of said arm, such means, when operated, adapted to cause the latter to be disengaged by a lateral movement, a rockable member operable to bear against the extremity of said arm, to thereby release the same from said means, and a bait-holding trigger hinged on an axis parallel to that of the jaw, the inner end of said trigger being connected with said rockable member and rocking the latter when the front end of the trigger is depressed.

3. An animal trap comprising a skeleton frame, a spring-actuated jaw hinged in such frame and arranged to strike the front cross-bar of the latter, an arm projecting from the front end of said jaw, a notch provided in the rear cross-bar of said frame with which the extremity of said arm may be engaged, a rockable member operable to bear against the extremity of said arm, to thereby release the same from said notch, and a bait-holding trigger hinged on an axis parallel to that of the jaw, the inner end of said trigger being connected with said rockable member and rocking the latter when the front end of the trigger is depressed.

4. An animal trap comprising a skeleton frame, a jaw hinged in such frame and arranged to strike the front cross-bar of the latter, a coil-spring on the hinge axis of said jaw, and having an arm projecting through and beyond the front end of the latter, means on the rear end of said frame for engaging the extremity of said arm, such means, when operated, adapted to cause the latter to be disengaged by a lateral movement, a rockable member operable to bear against the extremity of said arm, to thereby release the same from said means, and a bait-holding trigger hinged on an axis parallel to that of the jaw, the inner end of said trigger being connected with said rockable member and rocking the latter when the front end of the trigger is depressed.

5. An animal trap comprising a skeleton frame, a jaw hinged in such frame and arranged to strike the front cross-bar of the latter, a coil-spring on the hinge axis of said jaw, and having an arm projecting through and beyond the front end of the latter, a notch provided in the rear cross-bar of said frame with which the extremity of said arm may be engaged, a rockable member operable to bear against the extremity of said arm, to thereby release the same from said notch, and a bait-holding trigger hinged on an axis parallel to that of the jaw, the inner end of said trigger being connected with said rockable member and rocking the latter when the front end of the trigger is depressed.

6. An animal trap comprising a skeleton frame, a spring-actuated jaw hinged in such frame and arranged to strike the front cross-bar of the latter, an arm projecting from the front end of said jaw, means on the rear end of said frame for engaging the extremity of said arm, such means, when operated, adapted to cause the latter to be disengaged by a lateral movement, a bait-holding trigger hinged on an axis parallel to that of the jaw, a plate, a hinge pintle made of wire hinged on the hinge pin of said trigger and projecting through one end of said plate and the rear cross-bar of said frame, a lug projecting from the hinged end of said plate and bearing in a guide slot in said frame, the opposite end of the rockable plate being forked, and the related end of the trigger having a lug bearing in such fork.

7. An animal trap comprising a skeleton frame, a spring-actuated jaw hinged in such frame and arranged to strike the front cross-bar of the latter, an arm projecting from the front end of said jaw, a notch provided in the rear cross bar of said frame with which the extremity of said arm may be engaged, a bait-holding trigger hinged on an axis parallel to that of the jaw, a plate, a hinge pintle made of wire hinged on the hinge pin of said trigger and projecting through one end of said plate and the rear cross-bar of said frame, a lug projecting from the hinged end of said plate and bearing in a guide slot in said frame, the opposite end of the rockable plate being forked, and the related end of the trigger having a lug bearing in such fork.

ALBERT M. GRUBBS.

Copies of this patent may be obtained for five cents each, by addressing the "Commissioner of Patents, Washington, D. C."